United States Patent
Rissanen

(10) Patent No.: US 11,258,826 B2
(45) Date of Patent: *Feb. 22, 2022

(54) POLICY SEPARATION

(71) Applicant: Axiomatics AB, Stockholm (SE)

(72) Inventor: Erik Rissanen, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 392 days.

This patent is subject to a terminal disclaimer.

(21) Appl. No.: 16/537,795

(22) Filed: Aug. 12, 2019

(65) Prior Publication Data

US 2020/0076856 A1    Mar. 5, 2020

Related U.S. Application Data

(63) Continuation of application No. 15/016,667, filed on Feb. 5, 2016, now Pat. No. 10,382,487.

(30) Foreign Application Priority Data

Feb. 6, 2015 (EP) .................................... 15154143

(51) Int. Cl.
*H04L 29/06* (2006.01)
*H04L 41/0893* (2022.01)

(52) U.S. Cl.
CPC .......... *H04L 63/20* (2013.01); *H04L 41/0893* (2013.01); *H04L 63/10* (2013.01)

(58) Field of Classification Search
CPC ................... G06F 21/604; G06F 21/62; G06F 21/6218–6281; H04L 41/0893;

(Continued)

(56) References Cited

U.S. PATENT DOCUMENTS 7,886,335 B1 *  2/2011  Chickering ......... H04L 63/0263
                                                        726/1
8,812,733 B1 *  8/2014  Black ..................... H04L 67/10
                                                        709/246

(Continued)

OTHER PUBLICATIONS

Extended European Search Report dated Aug. 6, 2015, issued by the European Patent Office in corresponding European Application No. EP 15154143.0-1853 (6 pages).

(Continued)

*Primary Examiner* — Kevin Bechtel
(74) *Attorney, Agent, or Firm* — Buchanan Ingersoll & Rooney P.C.

(57) ABSTRACT

A policy decision point for interacting with a computer system including a plurality of resources, to which subjects' access is controlled by corresponding policy enforcement points. The PDP includes: a memory storing at least two policy packages, each controlling access rights to resources, and a connection table associating each policy package with an end point address; a network interface operable to communicate with the PEPs, wherein the network interface obtains access requests from a PEP and returns access decisions to the PEP, each access request including an end point address for directing the access request to the PDP; and a processor operable to: analyze an access request and determine, based on the end point address receiving the access request, an associated policy package; and evaluate the access request against the policy package thus determined.

13 Claims, 3 Drawing Sheets

(58) Field of Classification Search
CPC ......... H04L 63/0263; H04L 63/10–108; H04L 63/20–205
See application file for complete search history.

(56) References Cited

U.S. PATENT DOCUMENTS

| | | | |
|---|---|---|---|
| 2008/0060080 A1* | 3/2008 | Lim | H04L 63/107 726/26 |
| 2013/0081105 A1 | 3/2013 | Giambiagi | |
| 2013/0283338 A1 | 10/2013 | Kumar et al. | |
| 2015/0124809 A1* | 5/2015 | Edsall | H04L 41/0893 370/390 |

OTHER PUBLICATIONS

Oasis, Web Services Resource 1.2(WS-Resource) OASIS Standard, Apr. 1, 2006, Copyright© OASIS Open 2005. 1\11 Rights Reserved. (16 pages).

Axiomatics Policy Server 4.0 Reference Manual, (Sep. 14, 2010), published by Axiomatics AB. (60 pages).

Michael Wilson, STFC, TrustCoM Project Final Report, Sixth Framework Programme Priority IST-2002-2.3.1.9, TrustCom Final Report-Jul. 31, 2007, (37 pages).

Office Action (Communication pursuant to Article 94(3) EPC) dated Jul. 6, 2016, by the European Patent Office in Corresponding European Application No. 15 154 143.0-1853, (4 pages).

\* cited by examiner

POLICY SEPARATION

CROSS REFERENCE TO RELATED APPLICATIONS

The present application is a continuation of U.S. application Ser. No. 15/016,667, filed on Feb. 5, 2016, which claims the benefit of European Application No. 15154143.0, filed on Feb. 6, 2015. The entire content of each of U.S. application Ser. No. 15/016,667 and European Application No. 15154143.0 are hereby incorporated herein by reference in their entirety.

TECHNICAL FIELD

The invention disclosed herein generally relates to the field of automated access control and authorization. In particular, it relates to a component for evaluating an access request against a policy, such as a policy decision point, and a method for controlling a subject's access to a resource.

BACKGROUND

On a high level, attribute-based access control (ABAC) may be defined as a method where a subject's requests to perform operations on resources are granted or denied based on assigned attributes of the subject, assigned attributes of the resource, environment conditions, and a set of one or more policies that are specified in terms of those attributes and conditions. Here, attributes are characteristics of the subject, resource, or environment conditions. Attributes contain information given by a name-value pair. A subject is a human user or non-person entity, such as a device that issues access requests to perform operations on resources. Subjects are assigned one or more attributes. A resource (or object) is a system resource for which access is managed by the ABAC system, such as devices, files, records, tables, processes, programs, networks, or domains containing or receiving information. It can be the resource or requested entity, as well as anything upon which an operation may be performed by a subject including data, applications, services, devices, and networks. An operation is the execution of a function at the request of a subject upon a resource. Operations include read, write, edit, delete, copy, execute and modify. Environment conditions describe an operational or situational context in which an access request occurs. Environment conditions are detectable environmental characteristics. Environmental characteristics are generally independent of subject or resource, and may include the current time, day of the week, current stock market index, current temperature, or the current threat level. Finally, a policy is the representation of rules or relationships that makes it possible to determine if a requested access should be allowed, given the values of the attributes of the subject, resource, operation and possibly environment conditions. A policy may be expressed as a logical function, which maps an access request with a set of attribute values (or references to attribute values) to an access decision (or an indication that the request has not returned a decision).

An ABAC scenario is depicted in FIG. 1. In step 1, a user (or subject) 100 requests access to a resource 110 through the intermediary of an ABAC mechanism 120 which selectively protects access to the resource 110. The ABAC mechanism 120 forms a decision by retrieving, in step 2a-2b-2c-2d, applicable rules R1, R2, R3 from a policy repository 130, subject attributes (e.g. name, affiliation, clearance) from a subject attribute data source 140, resource attributes (e.g. type, owner, classification) from a resource attribute data source 150, and environment conditions expressed as environment attribute values from an environment attribute data source 160. If the ABAC mechanism 120 is able to determine that the decision is to permit access, it will take appropriate measures to grant the user 100 access to the resource 110, e.g. by selectively deactivating a hardware or software protection means. Otherwise, access to the resource 110 may be denied.

There currently exist general-purpose ABAC policy languages that have the richness to express fine-grained conditions and conditions which depend on external data. A first example is the Extensible Access Control Markup Language (XACML) which is the subject of standardization work in a Technical Committee of the Organization for the Advancement of Structured Information Standards (see http://www.oasis-open.org). A policy encoded with XACML consists of declarative (in particular, functional) expressions in attribute values, and the return value (decision) of the policy is one of Permit, Deny, Not Applicable, or Indeterminate. An XACML policy can apply to many different situations, that is, different subjects, resources, operations and environments and may give different results for them. The XACML specification defines how such a request is evaluated against the policy, particularly what policy attributes are to be evaluated or, at least, which values are required to exist for a successful evaluation to result. A key characteristic of this evaluation process is that the request must describe the attempted access to a protected resource fully by containing information sufficient for all necessary attribute values to be retrieved. In practice, it may be that the request is interpreted in multiple stages by different components, so that a PEP (Policy Enforcement Point) issuing the requests provides only some attribute values initially, and a PDP (Policy Decision Point) or other component responsible for the evaluation can dynamically fetch more values from remote sources as they are needed. A second example is the Axiomatics Language For Authorization™, which the applicant provides.

XACML-based solutions typically offer "authorization as a service", wherein a PEP in a target application/system captures access requests in real time and sends them to a PDP for evaluation against a current version of one or more XACML policies. Such externalized authorization approach ensures continuity in that it drastically reduces or eliminates the latency between an update of the policy and actual enforcement of the new rules therein.

A company may deploy a plurality of applications of ABAC policies in order to separate the plurality of applications. The reasons for separation of a deployment into a plurality of applications may be related to confidentiality of the information in the different applications, e.g. between different units or sites of a company. Further, separation of applications may be related to stability concerns, such that any malfunctions within one application do not affect another application.

However, a deployment of an ABAC policy consumes information technology (IT) resources of a company. Hence, deployment of a plurality of applications may lead to large overhead costs in IT administration and management. Further, the deployment of a plurality of applications may consume computing resources, mainly memory.

SUMMARY

It is an object of the invention to enable an improved administration of ABAC policies. It is a further object of the invention to enable isolation of different ABAC policies, while posing insignificant requirements on IT administration resources and computing resources.

These and other objects of the invention are at least partly met by the invention as defined in the independent claims. Preferred embodiments are set out in the dependent claims.

According to a first aspect of the invention, there is provided a policy decision point (PDP) for interacting with a computer system comprising a plurality of resources, to which subjects' access is controlled by corresponding policy enforcement points (PEPs), the PDP comprising: a memory configured to store at least two distinct policy packages, each controlling access rights to one or more of the resources in the computer system, and a connection table associating each of said at least two policy packages with one or more end point addresses; a network interface operable to communicate with at least two of the PEPs, wherein the network interface is arranged to obtain one or more access requests from a PEP and return one or more access decisions to a requesting PEP, each access request comprising an end point address associated with the PDP for directing the access request to the PDP; and a processor operable to: analyze an access request obtained by the network interface and determine, based on the end point address receiving the access request, an associated one of said at least two policy packages; and evaluate the access request against the policy package thus determined, thereby obtaining an access decision to be returned to and enforced by the PEP.

According to a second aspect of the invention, there is provided a computer system, comprising: a plurality of resources; a plurality of PEPs, corresponding to the plurality of resources for controlling subjects' access to the resources; and at least one PDP according to the first aspect of the invention, the PDP being operable to communicate with at least two of the PEPs.

According to a third aspect of the invention, there is provided a method in a PDP for controlling a subject's access to a resource, the PDP being arranged for interacting with a computer system comprising a plurality of resources, to which subjects' access is controlled by corresponding PEPs, said method comprising: obtaining an access request from a PEP through an end point address of the PDP; analyzing the obtained access request and determining, based on the end point address receiving the access request, an associated one of at least two policy packages stored by the PDP; and evaluating the access request against the policy package thus determined, thereby obtaining an access decision to be returned to and enforced by the PEP.

According to a fourth aspect of the invention, there is provided a computer program product comprising a computer-readable medium with computer-readable instructions for performing the method of the third aspect.

Thus, a PDP may comprise at least two policy packages. Further, the PDP may determine a policy package based on an end point address receiving an access request and the access request is then evaluated against this policy package. This implies that a single PDP may be used for handling several policy packages and that it is possible for the PDP to separate between the policy packages so that a request from one application associated with one policy package should not be affected by any malfunctions within another policy package.

Further, a single PDP may be deployed for handling access requests targeting several applications. This implies that the requirement set on computer resources and hardware capacity may be limited. Also, having a single PDP ensures that deployment of a single server for managing and configuring the ABAC system, including the PDP, is sufficient. This may severely reduce the requirements on IT administration and management resources.

As used herein, the term "policy package" should be construed as a package that comprises at least one policy set, which each comprise at least one policy, providing rules for mapping an access request to an access decision. The policy may refer to rules within a name space, such that a rule used by a plurality of policies needs only be completely defined and stored once. Within a policy package, references may therefore be made to common rules. The policy package may be administered as a coherent unit, such that an administrator is able to access the policies within the coherent unit when configuring or managing the policy package. The policy package may further comprise references to external rules, not administered within the coherent unit. Two policy packages are considered distinct, when there are no references from the coherent unit of one policy package to rules within the coherent unit of the other policy package. Although not referring to rules within each others' packages, the two policy packages may refer to common external rules. According to one embodiment, the two policy packages are completely separated by not referring to any common rules.

According to an embodiment, a unique policy package is associated to each end point address. Hence, each request to an end point address will be uniquely evaluated against the associated policy package. This implies that the PDP may isolate handling of the at least two policy packages.

According to an embodiment, the processor being operable to analyze an access request comprises the processor being operable to extract information indicating an end point that received the access request. Hence, the processor may obtain the end point address of the end point that received the access request in order to determine an associated policy package.

The information may be extracted from a header of the access request, wherein the header comprises the end point address. This implies that the processor need only read the header of the access request in order to determine an associated policy package. Hence, the processor may quickly determine the associated policy package.

In an embodiment, the end point address is a uniform resource identifier (URI). URIs are commonly used, e.g. as a uniform resource locator (URL) addressing a page on the World Wide Web and, therefore, almost any computer network will be able to handle a URI. The end point address being a uniform resource identifier may thus facilitate that an access request finds its way to the end point address during transfer of the request over a computer network.

In an embodiment, the processor is further operable to determine a destination of the access decision based on information in the access request. The access request may carry information to the PDP in order to enable an access decision to be properly returned to the PEP. For instance, the access request may include an address of the PEP that is to receive the access decision. Alternatively, the PDP and the PEP may have an established two-way network connection. In such case, the access request need not include an address. Rather, the processor of the PDP may determine a destination of the access decision based on information of an identity of the PEP sending the access request.

In evaluating the access request against the policy package, values of such attributes whose values are not explicit in the access request, yet necessary to complete the evaluation of the access request, may be needed. Therefore, the PDP may comprise an attribute connector that may be operable to communicate with a data source, such as a database. The data source may provide information of values of attributes to the attribute connector, and the values may then be used in evaluating the access request. The PDP may comprise a plurality of attribute connectors, which are each associated with a single policy package. This implies that each attribute connector is used by a unique policy package and that the attribute connectors are thereby separated within the PDP. Hence, handling of the policy packages is separated within the PDP, also as far as remote attribute value retrieval is concerned.

In an embodiment, the PDP further comprises at least one administration end point address for receiving configuration settings of the PDP, wherein the PDP is arranged to allow changes to the policy packages through the at least one administration end point address. By this architecture, configuration of the policy packages is inherently controlled in order to manage access to changing configuration of the policy packages.

In a further embodiment, an administrator's configuration access to configuration of the PDP is restricted by an administrator account to one policy package associated with one end point address. Hence, an administrator may only access one policy package associated with the administrator account of the administrator, which implies that the policy packages are truly separated. Thus, any mistakes by an administrator in configuring a policy package will not affect the functionality of other policy packages of the PDP.

In yet a further embodiment, configuration settings controlling attribute connectors may also be received through the administration end point address. The administrator's configuration access to attribute connectors may also be restricted by the administrator account to attribute connectors associated with the accessible policy package. This implies that the administrator may only be allowed to configure one policy package with its associated attribute connectors at a time.

It is noted that the invention relates to all combinations of features, even if recited in mutually separate claims.

BRIEF DESCRIPTION OF DRAWINGS

These and other aspects of the present invention will now be described in further detail, with reference to the appended drawings showing embodiment(s) of the invention.

Unless otherwise stated, the drawings show only such components or features that are necessary to illustrate the example embodiments, while other components may have been intentionally left out in the interest of clarity. Further, like reference numerals refer to like elements on the drawings.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, to fully convey the scope of the invention to the skilled person.

Figure 1:
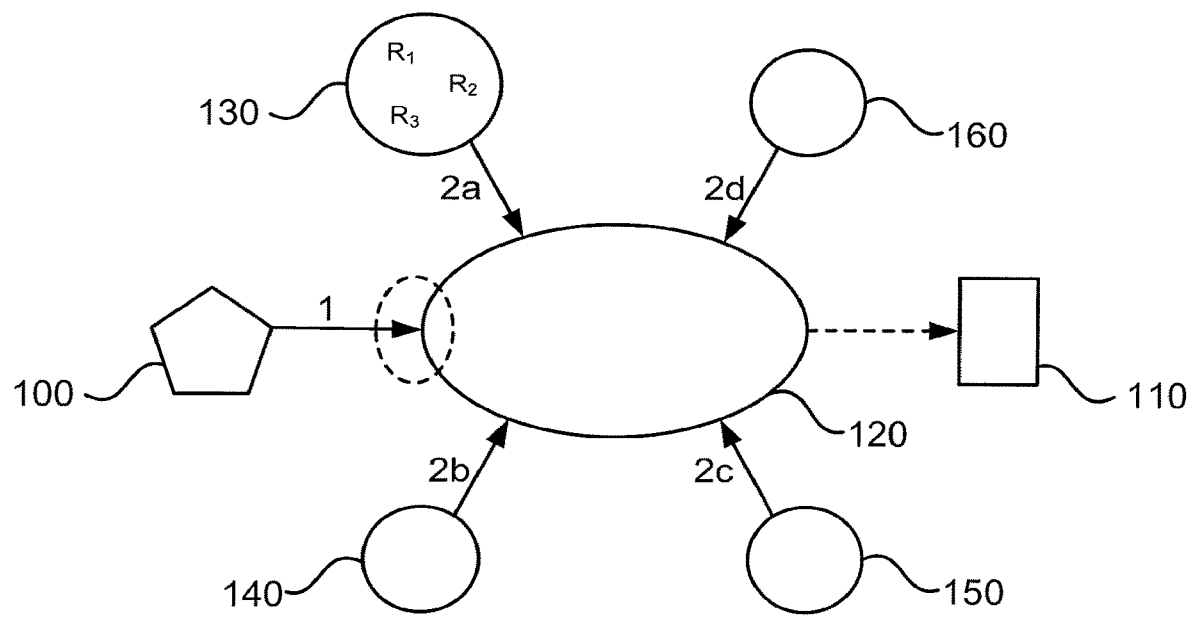
FIG. 1 is a schematic view illustrating an access scenario in accordance with an ABAC model.
Figure 2:
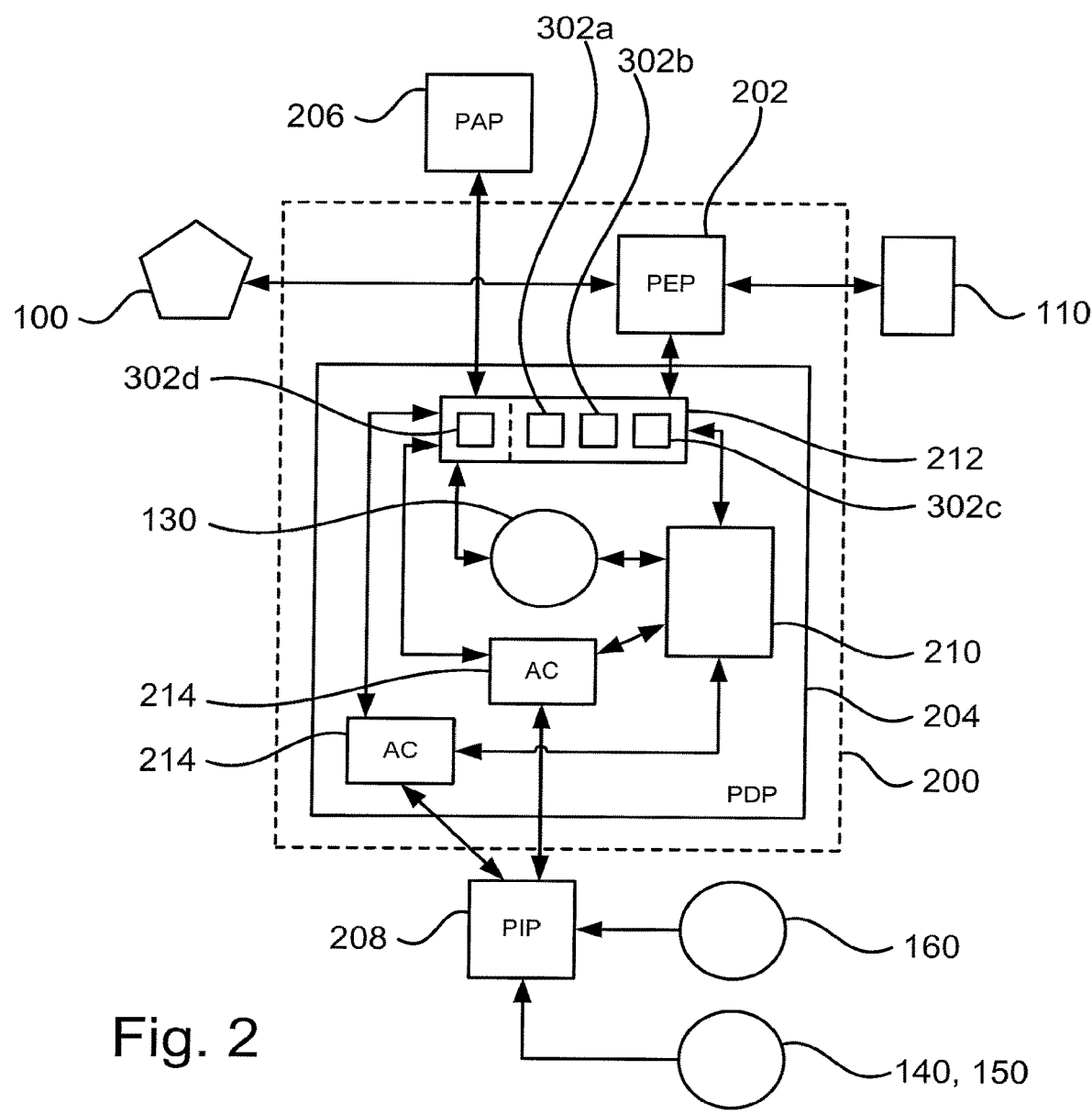
FIG. 2 is a block diagram showing a computer system equipped with authorization services.

FIG. 2 illustrates an example ABAC implementation and possible flows of information when authorization services 200 process a subject's 100 request to access a resource 110 by using or performing an operation on the resource 110. The authorization services 200 include a policy enforcement point (PEP) 202, which selectively permits or prevents the subject's 100 access to the resource 110, e.g. by selectively activating and deactivating hardware or software protection means, and a policy decision point (PDP) 204. The access request is to be evaluated against an ABAC policy in a policy repository 130, which is formed in a memory in the PDP 204. The policy may be maintained from a policy administration point (PAP) 206. The PDP 204 may be configured to retrieve necessary information describing the ABAC policy from its internal repository 130. From a policy information point (PIP) 208, the PDP 204 may request any such values of policy attributes that are missing from the initial access request but necessary to evaluate the request against the policy. In turn, the PIP 208 may request these values from an attribute repository 140-150 storing values of subject, resource, and operation attributes (in this sense, the repository may be seen as an entity combining the functionalities of the data sources 140 and 150 in FIG. 1 and has been labelled accordingly) and/or from an environment conditions repository 160. The evaluation of the access request may then complete, and a decision may be returned to the subject 100. If the decision is permissive, the PEP 202 grants access to the resource 110, as requested.

A computer system may comprise a plurality of resources 110 to which access is to be controlled. A plurality of PEPs 202 may be arranged to enforce access control to the plurality of resources 110. The plurality of PEPs 202 may be arranged to communicate with a single PDP 204 in order to obtain access decisions. For brevity, the below description is mainly given in relation to one PEP 202 enforcing access to one resource 110.

The subject 100 may be a human user requesting access to a resource 110. For instance, a person may try to access a file in a computer system, or a physical resource, such as an entrance door with a network-connected, automatically controlled lock. The subject 100 may be identified in the computer system e.g. by means of a user account, which the person is logged on to, or an identifier obtained through an access card applied to a reader connected to the computer system. The subject 100 may alternatively be a non-human entity, such as a computer program being executed in the computer system, which requests access to a resource 110 in the computer system independently of direct user interaction.

In an example embodiment, the computer system is one or more of the following: a general-purpose file management system; a document management system; a content management system, a financial system; a communications system; an industrial control system; an administrative system; an enterprise system; a simulations system; a computational system; an entertainment system, an educational system; a defence system. In an example embodiment, the resources 110 in the computer system are one or more of the following: devices, files, records, tables, processes, programs, networks, domains containing or receiving information.

A PEP 202 may be connected to a resource 110, such that when a subject 100 requests access to the resource 110, the corresponding PEP 202 is activated.

The PEP 202 may be implemented in software, hardware, or as any combination of software and hardware. The PEP 202 may, for instance, be implemented as software being executed on a general-purpose computer, as firmware arranged e.g. in an embedded system, or as a specifically designed processing unit, such as an Application-Specific Integrated Circuit (ASIC) or a Field-Programmable Gate Array (FPGA).

In a particular embodiment, the PEP 202 may be a process that is run on a server in the computer system. When a subject 100 requests access to e.g. a file in the computer system, the PEP 202 may be activated in order to start a process to determine whether access is to be permitted.

In another embodiment, the PEP 202 may be a process that is run on a processor, which may be co-located with the resource 110. For instance, if the resource 110 is an entrance, which may be opened only on a permitted access request, the PEP 202 may be run on a processor located at the entrance. Such a localized processor may be connected to the computer system in order to transfer access requests from the PEP 202 to a PDP 204.

The PDP 204 may comprise a processor 210, which is configured to run a process for analyzing and evaluating an access request. The processor 210 may be any type of processor that is able to execute computer instructions, such as a processor on a general-purpose computer, or a specifically designed processing unit, such as an Application-Specific Integrated Circuit (ASIC) or a Field-Programmable Gate Array (FPGA).

In an embodiment, the PDP 204 may be implemented in a server in the computer system. In another embodiment, the PDP 204 may be implemented in a local processor with associated memory, which may be co-located with the resource 110.

The PDP 204 may further comprise a network interface 212, which is operable to communicate with the PEP 202. The PDP 204 may thus receive access requests from the PEP 202 through the network interface 212 and may return access decisions to the PEP 202 through the network interface 212. The network interface 212 may define one or more end point addresses 302a-c, forming a contact point for communication between the PDP 204 and the PEP 202.

The network interface 212 may be implemented as a process controlling network communication, which is run on the processor 210. The network interface 212 may alternatively be implemented as hardware for receiving and sending signals in the computer system with corresponding software for controlling such hardware.

The PDP 204 may further comprise a memory 130, which stores a policy package against which an access request is to be evaluated. The memory 130 may be implemented as any type of storage for storing information, such as any type of hard disk, a random access memory (RAM), a read-only memory (ROM), an electrically erasable programmable read-only memory (EEPROM), or a flash memory.

The memory 130 of the PDP 204 may be provided separate from the processor 210, such that the memory 130 and the processor 210 may e.g. be provided in two different physical computer units. However, the combination of the memory 130 and the processor 210 may still be considered to be included in the PDP 204.

In an example embodiment, the ABAC policy or policies which the PDP 204 evaluates is encoded using a markup language. Suitable examples include the following: XML; XACML of the latest standardized version released at the original filing date of the present disclosure, or a future version that is backwards compatible with respect to the applicable standardized XACML version; Axiomatics Language for Authorization™ available from the applicant.

The processor 210 is connected to the memory 130 such that the processor 210 may access the memory 130 for loading the policy package when an access request is to be evaluated. A policy package may comprise a plurality of policies, which policies may provide rules for handling access requests to different types of resources 110. The policy package may be administered as a coherent unit, such that an administrator is able to access the policies within the coherent unit when configuring or managing the policy package. Within a policy package, the plurality of policies may refer to common rules, such that a rule needs only to be completely defined and stored once. Also, a policy package may refer to external rules, which may not be administered within the coherent unit.

When the processor 210 of the PDP 204 receives an access request, the processor 210 accesses the memory 130 in order to fetch the relevant policy. The processor 210 will then evaluate the access request against the policy in order to reach an access decision (or an indication that the request has not returned a decision).

In order to evaluate the access request, the processor 210 uses attributes assigned to the subject 100. The access request may comprise values of the attributes. However, some values may not be directly known to the PEP 202. Hence, the access request may comprise information about the subject 100 that allows the values of the attributes to be determined.

The PDP 204 may further comprise attribute connectors 214, which may be arranged to request values of attributes. An attribute connector 214 may be implemented as a process, which may call a PIP 208. The attribute connector 214 may be set up as a number of rules for creating such calls to the PIP 208. Based on a call from the attribute connector 214, the PIP 208 may request the values of attributes from an attribute repository 140-150 and/or from an environment conditions repository 160. A plurality of attribute connectors 214 may be associated with the policy package, e.g. for fetching information of different types of attributes.

As an example, an access request may comprise an identifier of a subject 100 requesting access to a resource 110. An attribute connector 214 may send the identifier in a request to a PIP 208 in order to obtain a value of an attribute associated with a property or characteristic of the subject 100. The PIP 208 may then request a value of an attribute from, say, a human resource database within the computer system, in which database the identifier of the subject 100 is associated with the subject's position within the organization. Hence, a value of an organizational position attribute, which is retrieved in the database by using the subject identifier attribute as key, may be returned to the PDP 204 through the PIP 208 and the attribute connector 214.

The attribute repositories 140-150 and the environment conditions repository 160 may form data sources that could be separately managed. Although the information in the data sources may have a decisive impact on an access decision, its maintenance and updating need not be primarily associated with managing authorizations. Rather, information that is needed to be stored anyway, such as HR, building, computer hardware and other information within an organization, may be stored in a data source and may also be used by the authorization services 200 for obtaining values of attributes.

The processor 210 of the PDP 204 may be configured to evaluate the access request against the relevant policy, using the determined values of attributes. The processor 210 may thus determine whether access to the resource 110 is to be permitted. If the processor 210 is able to determine that access to the resource 110 is to be permitted, the processor 210 may output an access decision that permits access. Otherwise, the processor 210 may output an access decision that denies access. A policy encoded with XACML may output a value of the access decision as one of Permit, Deny, Not Applicable, or Indeterminate.

The PDP 204 may return the access decision to the PEP 202 for enforcing the decision. If access is to be permitted, the PEP 202 may e.g. selectively deactivate a hardware or software protection means such that the subject 100 may access the resource 110. This may imply that the subject 100 is able to perform an operation, such as read, write, edit, delete, copy, execute and modify, on a data object, such as a file, record, table, process, or program. Alternatively, the deactivation of protection means may e.g. imply that a signal is transmitted to a mechanical lock for allowing a door to be opened.

In the present example, the network interface 212 of the PDP 204 further defines at least one administration end point address 302*d* in order to facilitate communication between the PDP 204 and the PAP 206. The PAP 206 may access a policy package in the memory 130 through the communication via the administration end point address with the network interface 212 in order to allow configuration of the policy package. An administrator's configuration access to configuration of the PDP 204 may be restricted in relation to the administrator account used for accessing the PDP 204 through the PAP 206.

The PAP 206 may provide a user interface allowing an administrator to configure and administer the policy package maintained in the PDP 204. The administrator may log on to the PAP 206 using an administrator account, which may be used as input for restricting access to configuration of the PDP 204. The PAP 206 may be implemented as pure software, or a combination of software and hardware. The PAP 206 may, for instance, be implemented as a software being executed on a general-purpose computer or as firmware arranged e.g. in an embedded system providing a processor. The PAP 206 may provide a process for enabling an administrator to add or remove policies or change the configuration of a policy package.

The PAP 206 may also access attribute connectors 214 of the PDP 204 in order to configure the attribute connectors 214. For instance, the connection to data sources via the PIP 208 may be configured or rules controlling how values of the attributes are to be fetched may be configured, e.g. from what source, using what query language.

The PDP 204 may store a plurality of distinct policy packages, at least two, in the memory 130. Two policy packages are considered distinct, when there are no references from the coherent unit of one policy package to rules within the coherent unit of the other policy package. These distinct policy packages may be handled separately within the PDP 204. This implies that the PDP 204 may support PEPs 202 of completely different applications within the computer system, without the operation of one policy package affecting other policy packages.

A computer system may be used by a number of different applications and users, which have different requirements. For instance, the computer system may be used in support or running of an industrial process of a company. The computer system may also be used for managing a finance system of the company. It may therefore be important that any malfunctions or problems within one application do not affect another application in the computer system. For instance, the control of accesses within the running of an industrial process should not be affected by any disruptions within the finance system.

Thanks to the PDP's 204 storing a plurality of distinct policy packages and separately handling these policy packages, a plurality of applications within a computer system may be managed by the same PDP 204 without a risk of problems within one application using one policy package propagating to other applications using other policy packages. Hence, there is no need for deploying a plurality of authorization services 200 with respective PDPs in order to separate the applications from each other. Rather, the handling of the applications may be performed separately within a PDP 204 of the authorization services 200.

Figure 3:
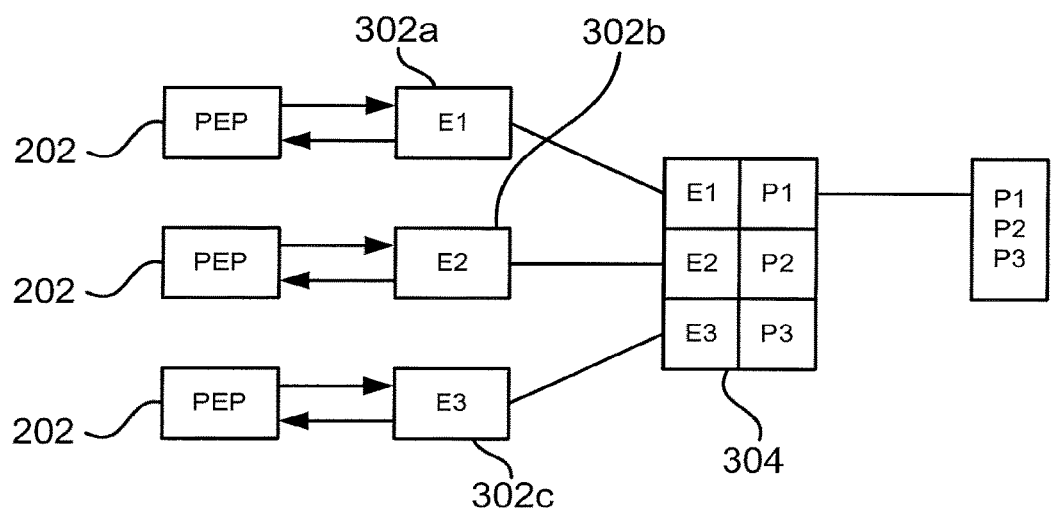
FIG. 3 is a schematic view illustrating an association of policy packages with end point addresses of a policy decision point.

As further illustrated in FIG. 3, the first network interface 212 of the PDP 204 may be configured with a plurality of end point addresses 302*a-c*. The memory 130 of the PDP 204 may further comprise a connection table 304, which associates each of the plurality of policy packages with one or more of the end point addresses 302*a-c*. The connection table 304 may associate a unique policy package to each end point address 302*a-c*.

The end point address 302*a-c* may be a uniform resource identifier (URI), such as a uniform resource locator (URL). The end point address 302*a-c* being an URL facilitates that an access request finds its way to the end point address 302*a-c* during transfer of the request in the computer system.

A PEP 202 may be set up to send access requests to one specific end point address 302*a*, 302*b* or 302*c* of the PDP 204. The PEP 202 will thus always communicate with the PDP 204 through the set-up end point address. Upon set-up of the authorization services 200, two-way communication between the PDP 204 and the PEP 202 may be established, such that the PDP 204 will also know a destination address of messages to be sent to the PEP 202.

When receiving an access request through one of the end point point addresses 302*a-c*, the corresponding policy package associated with the end point address 302*a-c* may be determined from the connection table 304. Hence, the correct policy package related to the requesting PEP 204 will always be used.

The PDP 204 may also comprise a plurality of sets of attribute connectors 214. Each set of attribute connectors 214 may be associated to a unique policy package, such that the sets of attribute connectors 214 are separated from each other. Hence, the fetching of values of attributes via the PIP 208 will be separately controlled by a unique set of attribute connectors 214 for each policy package. This further ensures separation of the handling of access requests for different applications.

The administration of the policy packages and the sets of attribute connectors 214 may also be separated. The PDP 204 may only allow access to a single policy package and its associated set of attribute connectors 214 at a time. An administrator account of the PAP 206 may be associated with a single policy package, such that another administrator account needs to be used if another policy package is to be administered. Hence, administration of different policy packages may be separated to different users and associated with their respective administrator accounts.

Alternatively, separate instances of the PAP 206 may be arranged to communicate with different administration end point addresses, and each policy package may be associated with an administration end point address for restricting configuration access to the policy package through the administration end point address on which communication to the PDP 204 is established. As a further alternative, only a single policy package may be able to be administered during a single session of communication between the PAP 206 and the PDP 204. Hence, if two policy packages are to be administered, two separate sessions of the PAP 206 contacting the PDP 204 needs to be used.

Figure 4:
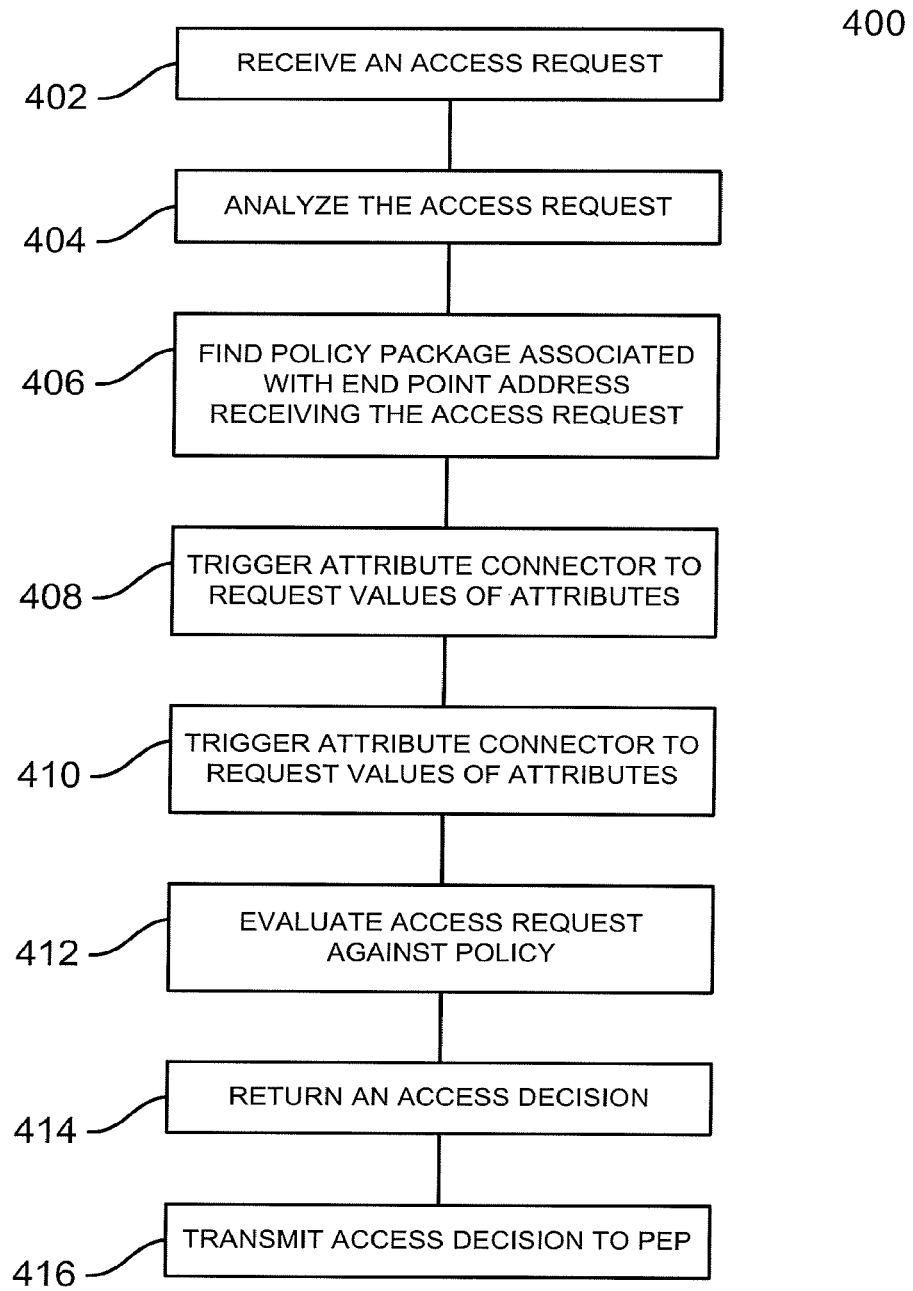
FIG. 4 is a flowchart of a method for controlling a subject's access to a resource.

Referring now to FIG. 4, a method 400 of handling an access request will be described. A PEP 202 identifies that a subject 100 desires access to a resource 110. The PEP 202 then generates and sends an access request to the specific end point address 302*a-c*, which is pre-defined in the set-up of the PEP 202. The PDP 204 receives the access request at the end point address 302*a-c*, step 402. The access request is transferred to the processor 210 of the PDP 204.

The processor 210 analyzes the access request, step 404. First, the processor 210 determines an end point address 302*a-c* that received the access request. This may be determined by means of the transfer of the access request from the end point address 302*a-c* to the processor 210 signalling which end point address 302*a-c* received the access request. Alternatively, the processor 210 may extract information from the access request indicating the end point address 302*a-c*. For instance, the end point address 302*a-c* may be extracted from a header of the access request.

The processor 210 makes a look-up in the connection table 304 in order to find the policy package that is associated with the end point address 302*a-c* that received the access request, step 406. The processor 210 then establishes access to the correct policy package.

The processor 210 determines which policy in the policy package that the access request should be evaluated against. This may depend on the resource 110 to which access is requested. The processor 210 then determines which attributes that will be used in the evaluation of the policy. If values of any of these attributes are not available, an attribute connector 214 is triggered to request the values of the attributes, step 408. The attribute connector 214 sends a corresponding request to the PIP 208, which forwards a request to obtain the values of the attributes to the corresponding data source(s), such as the attribute repositories 140-150 or the environment conditions repository 160. The thus obtained values of the attributes are returned to the processor 210.

Once the access request, the policy and the values of the necessary attributes are available to the processor 210, the processor 210 may evaluate the access request against the policy, step 410. The evaluation of the access request may even be commenced before all values of necessary attributes are available, such that the processor 210 may perform the evaluation step 410 at least partly in parallel with values of attributes being obtained in step 408. The policy may be a logical function, which maps a set of values of attributes to an access decision. Hence, providing the access request and the set of values of attributes as input, the evaluation will return an access decision, step 412, which may be permission or denial of access to the resource 110.

The processor determines a destination address of the access decision. This may be performed by extracting the destination address from the access request or by a two-way communication with the requesting PEP 202 being established, such that the destination address is known to the processor 210. The processor 210 then transmits the access decision to the PEP 202 via the first network interface 212, step 414.

The PEP 202 receives the access decision and enforces the decision, step 416. If the access decision is to permit access to the resource 110, the PEP 202 may deactivate a hardware or software protection means so as to allow the subject 100 access to the resource 110.

A computer program product may comprise computer-readable instructions for controlling the processor 210 to perform the method of controlling a subject's access to a resource as described above. The computer program product may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Even though the present disclosure describes and depicts specific example embodiments, the invention is not restricted to these specific examples. Modifications and variations to the above example embodiments can be made without departing from the scope of the invention, which is defined by the accompanying claims only.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs appearing in the claims are not to be understood as limiting their scope.

The invention claimed is:

1. A server device comprising a policy decision point (PDP), arranged for interacting with a computer system comprising a plurality of resources, to which subjects' access is controlled by corresponding policy enforcement points (PEPs), the PDP being configured to:
    obtain an access request from a PEP through an end point address of a plurality of end point addresses pointing to the PDP;
    analyze the obtained access request and determine, based upon which end point address of the plurality of end point addresses pointing to the PDP is the end point address in which the access request was received, an associated one of at least two policy packages stored by the PDP;
    evaluate the access request against the policy package thus determined, thereby obtaining an access decision; and
    returning the access decision to the PEP to be enforced by the PEP.

2. The PDP of claim 1, comprising:
    a memory configured to store at least two distinct policy packages, each controlling access rights to one or more of the resources in the computer system, and a connection table associating each of said at least two policy packages with one or more end point addresses;

a network interface operable to communicate with at least two of the PEPs, wherein the network interface is arranged to obtain one or more access requests from a PEP and return one or more access decisions to a requesting PEP, each access request comprising an end point address associated with the PDP for directing the access request to the PDP; and a processor operable to:

analyze an access request obtained by the network interface and determine, based on the end point address receiving the access request, an associated one of said at least two policy packages; and evaluate the access request against the policy package thus determined, thereby obtaining an access decision to be returned to and enforced by the PEP.

3. The PDP according to claim 2, wherein the connection table associates a unique policy package to each end point address.

4. The PDP according to claim 2, wherein the processor being operable to analyze an access request comprises the processor being operable to extract information indicating an end point address that received the access request.

5. The PDP according to claim 4, wherein the information is extracted from a header of the access request, wherein the header comprises the end point address.

6. The PDP according to claim 2, wherein the processor is further operable to determine a destination of the access decision based on information in the access request.

7. The PDP according to claim 1, wherein the end point address is a uniform resource identifier, URI.

8. The PDP according to claim 1, further comprising at least two attribute connectors, each being associated with a single policy package and each being operable to communicate with a data source providing values of attributes to be used in evaluating the access request against the policy package.

9. The PDP according to claim 1, further comprising at least one administration end point address for receiving configuration settings of the PDP, wherein the PDP is arranged to allow changes to the policy packages through the at least one administration end point address.

10. The PDP according to claim 9, wherein an administrator's configuration access to configuration of the PDP is restricted by an administrator account to one policy package associated with one end point address.

11. The PDP according to claim 10, wherein an administrator's configuration access to attribute connectors is restricted by the administrator account to attribute connectors associated with an accessible policy package.

12. A method in a policy decision point (PDP), for controlling a subject's access to a resource, the PDP being arranged for interacting with a computer system comprising a plurality of resources, to which subjects' access is controlled by corresponding policy enforcement points (PEPs) said method comprising:

obtaining an access request from a PEP through an end point address of a plurality of end point addresses pointing to the PDP;

analyzing the obtained access request and determining, based upon which end point address of the plurality of end point addresses pointing to the PDP is the end point address in which the access request was received, an associated one of at least two policy packages stored by the PDP;

evaluating the access request against the policy package thus determined, thereby obtaining an access decision; and returning the access decision to the PEP to be enforced by the PEP.

13. A computer program product comprising a non-transitory computer-readable medium with computer-readable instructions for performing a method in a policy decision point (PDP) for controlling a subject's access to a resource, the PDP being arranged for interacting with a computer system comprising a plurality of resources, to which subjects' access is controlled by corresponding policy enforcement points (PEPs), said method comprising:

obtaining an access request from a PEP through an end point address of a plurality of end point address of a plurality of end point addresses pointing to the PDP;

analyzing the obtained access request and determining, based upon which end point address of the plurality of end point addresses pointing to the PDP is the end point address in which the access request was received, an associated one of at least two policy packages stored by the PDP;

evaluating the access request against the policy package thus determined, thereby obtaining an access decision; and returning the access decision to the PEP to be enforced by the PEP.

* * * * *